United States Patent [19]

Ma

[11] Patent Number: 4,494,508
[45] Date of Patent: Jan. 22, 1985

[54] IGNITION SYSTEM

[75] Inventor: Thomas T. Ma, Chelmsford, England

[73] Assignee: Ford Motor Company, Dearborn, Mich.

[21] Appl. No.: 541,824

[22] Filed: Oct. 14, 1983

[30] Foreign Application Priority Data

Dec. 22, 1982 [GB] United Kingdom ............... 8236485

[51] Int. Cl.$^3$ .................................... F02P 5/04
[52] U.S. Cl. ............................... 123/406; 123/169 R; 123/169 PA; 123/426; 123/306; 123/494; 123/425; 123/419
[58] Field of Search ............... 123/425, 406, 494, 415, 123/416, 426, 306, 419, 169 R, 169 PA

[56] References Cited

U.S. PATENT DOCUMENTS

| | | | |
|---|---|---|---|
| 1,208,926 | 12/1916 | Dick | 123/425 |
| 2,064,572 | 12/1936 | Smith | 123/425 |
| 3,100,479 | 8/1963 | Wood | 123/425 |

FOREIGN PATENT DOCUMENTS

| | | | |
|---|---|---|---|
| 22159 | 1/1981 | European Pat. Off. | 123/425 |
| 1516987 | 7/1978 | United Kingdom | 123/425 |
| 1573897 | 8/1980 | United Kingdom | 123/425 |
| 2099918 | 12/1982 | United Kingdom | 123/425 |

*Primary Examiner*—Ronald B. Cox
*Attorney, Agent, or Firm*—Peter Abolins; Robert D. Sanborn

[57] ABSTRACT

The invention relates to an ignition system in which a parameter of the charge in a cylinder prior to ignition is measured in order to predict the burning characteristics of that charge and the timing of the spark for igniting that charge in the same cycle is varied in dependence upon the measured parameter in such a sense as to reduce cycle to cycle variations in the engine output torque. A hot film anemometer integrated into the spark plug provides a measurement of the charge velocity, this being one parameter which can predict the burning rate of the charge.

14 Claims, 4 Drawing Figures

IGNITION SYSTEM

BACKGROUND OF THE INVENTION

1. Field of the Invention

The present invention relates to a ignition system for an internal combustion engine.

2. Prior Art

It is the aim of every ignition system to time the spark in the combustion chamber of the cylinders of the engine to provide the maximum torque output. The charge in the cylinder takes a finite time to burn and the spark must ideally be timed to ensure that the termination of the combustion coincides with a particular cranking angle. If the spark is delayed, then the maximum torque is not transmitted to the crankshaft whereas if it is advanced, the pressure developed by the explosion is partly applied prior to top dead center thereby both damaging the engine and reducing the energy transferred to the crankshaft.

Hitherto, several proposals have been made in order to achieve optimum timing, which varies with the numerous parameters affecting the combustion conditions within the cylinder chambers. Thus, the ignition timing needs to be altered in dependence upon speed, upon engine load and upon air fuel ratio among other things.

All existing known ignition systems aim to produce an average timing for the spark which maximizes the torque, this timing angle being referred to herein as MBT (mean best torque) timing. If the timing is occurring correctly at MBT, then the efficiency of the engine will not be determined by the type of ignition system achieving this correct setting. Thus, previously proposed systems for feedback control of the timing in dependence upon various parameters, such as direct measurement of flame propagation speed, have enabled adaptive control of the timing but have not improved engine efficiency as such as compared with a conventional engine where the timing has been accurately set by calibration.

Even when an engine has been correctly tuned, it is noticeable when monitoring the maximum pressure developed within a combustion chamber on consecutive cycles that there are significant variations from one cycle to the next. All that conventional systems can do is ensure that the mean level is optimized. However, the significant fluctuations clearly indicate that with even a correctly tuned engine using known equipment, there are several cycles in which the combustion conditions within the cylinder chamber are different from those predicted, that is to say different from the average, and during all such cycles the internal combustion engine is producing less than optimum output.

SUMMARY OF THE INVENTION

In accordance with the present invention, there is provided an ignition system in which a parameter of the charge in a cylinder prior to ignition is measured in order to predict the burning characteristics of that charge and the timing of the spark for igniting that charge in the same cycle is varied in dependence upon the measured parameter in such a sense as to reduce cycle to cycle variations in the engine output torque.

The invention recognizes that the efficiency of the engine can be improved by reducing the spread and achieving cycle to cycle control of the combustion process. Such control cannot be achieved by a feedback system which is not based on prediction but on setting a mean level based upon the history of the combustion.

It has been found that a parameter of the charge which correlates consistently with the flame propagation speed is the flow velocity measured within the charge in the vicinity of the spark plug before, or preferably immediately prior to ignition. This has been proved experimentally using laser techniques in order to measure flow velocity within the combustion chamber but such techniques are not believed to be practicable within the context of a commercial vehicle.

Thus, in accordance with a second aspect of the present invention, there is provided an ignition system in which an anemometer within the combustion chamber is operative to measure the charge velocity and means are provided for perturbing the spark timing to advance or retard the timing in dependence upon the measured velocity.

Conveniently, the anemometer includes a resistive element measuring the charge velocity by the cooling effect of the fresh charge.

The cooling effect will vary chiefly with the velocity of the charge though it will be affected by such other parameters as density which will also have an influence on the burning characteristics of the charge.

In an advantageous development of the invention, the anemometer required for measuring the velocity of the charge in the cylinder is incorporated in a spark plug. This has the advantage that the cylinder and the engine require little modification or adaptation to accept the modified ignition system.

It is not easy to measure the velocity of gas accurately in an internal combustion engine given that the velocity sensor will be sensitive to other parameters, such as temperature, which fluctuate significantly within a combustion chamber. Thus, it is not believed practicable to effect accurate calibration of the timing as a function of the measured velocity. However, using equipment which can be manufactured economically, such as a hot film anemometer integrated into a spark plug, one can achieve at least an approximate measurement indicative of the cycle to cycle variation in the velocity.

By this technique it is not intended that the measured velocity should be used to set the correct ignition timing (which may be set by any other known ignition control system) but it is intended only to perturb the set mean timing in a sense to suppress the cycle to cycle variations of which the fluctuations in the measured velocity are representative.

Thus, in the preferred embodiment of the invention, the output of the anemometer is monitored to detect crossings of predetermined thresholds and the ignition timing is advanced and/or retarded by fixed predetermined increments with each such crossing.

Such predictive control of the ignition timing will not set the MBT at its optimum value, but once the MBT has been correctly set by separate means the perturbation will serve to minimize the pressure fluctuations from the cycle to cycle and thereby improve the output torque from each individual charge.

It is preferred for the means measuring the gas velocity to be as close as possible to the spark gap and for the velocity measurement to be timed to take place only briefly before the expected earliest timing angle. Effectively, the anemometer is monitoring the flow conditions as close as possible both spatially and in time to the source of the ignition, these being the factors which indicate the flame propagation speed, and fluctuations in flame propagation speed from cycle to cycle.

The extent of fluctuation which takes place depends on the fuel to air ratio. It has been found experimentally that when running at a stoichiometric ratio the fluctuations are at a minimum whereas as the mixture becomes leaner the fluctuations become more pronounced and the engine runs more erratically.

Preferably, the fixed increments by which the ignition is advanced or retarded when the thresholds are crossed may be varied in dependence upon the fuel to air ratio so that a greater compensation timing angle is introduced when the engine is running with a weak mixture than when the engine is running with a stoichiometric ratio.

In accordance with a further aspect of the invention, there is provided in combination a spark plug and an anenometer, the anenometer comprising a resistive element arranged in close proximity to the spark gap for measurement of the flow velocity in the vicinity of the spark gap prior to combustion.

DETAILED DESCRIPTION OF THE INVENTION

Figure 1:
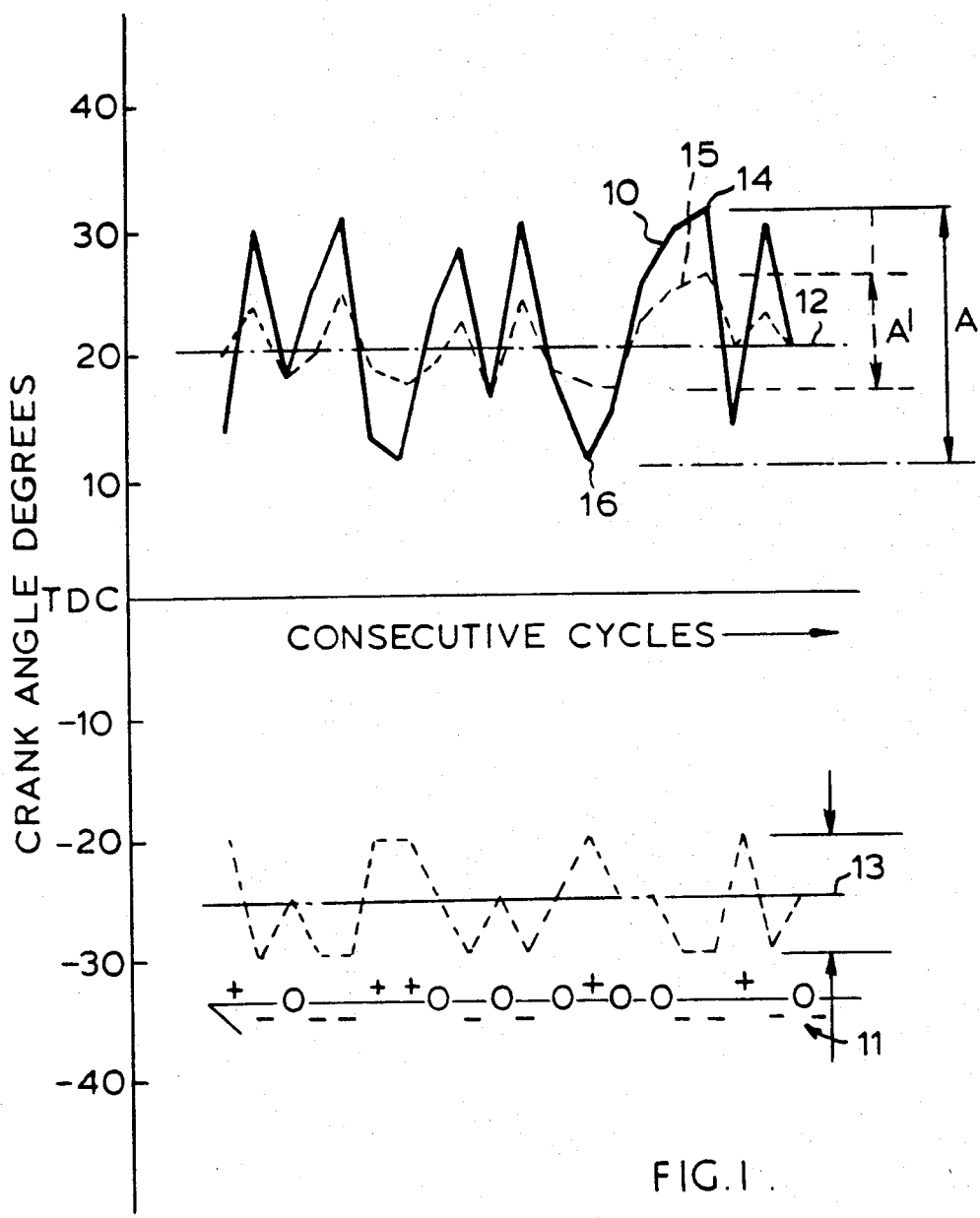
FIG. 1 is a waveform diagram to illustrate the purpose of the ignition system of the invention.

In FIG. 1, the waveform 10 shown in solid lines represents the variations from cycle to cycle in the flame arrival time as measured by an ionization probe in a conventional internal combustion engine. When tuning the engine, the timing is adjusted such that the mean level of this waveform, designated 12, occurs at an optimized time. However, though the arrival times measured in crank angle degrees should be constant there is a considerable spread about this mean, the amplitude of the spread being designated A in FIG. 1. In any cycle where the arrival time differs significantly from the means such as the peaks 14 and 16, the average spark timing would have differed significantly from the optimum spark timing for that charge.

There are many reasons why there can be a change from one cycle to another in the combustion conditions within a chamber and it would be difficult to cure the problem in the sense of ensuring that each charge has identical burning characteristics.

Figure 2:
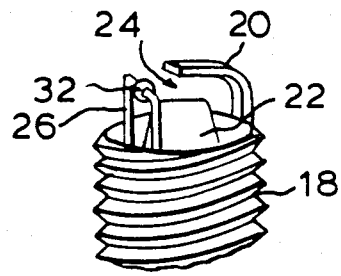
FIG. 2 is a perspective view of the end of a spark plug incorporating a hot film anenometer.
Figure 3:
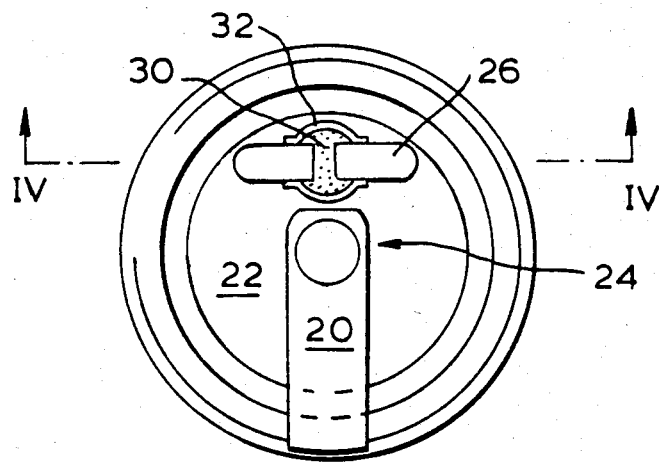
FIG. 3 is a view from above of the spark plug in FIG. 2.
Figure 4:
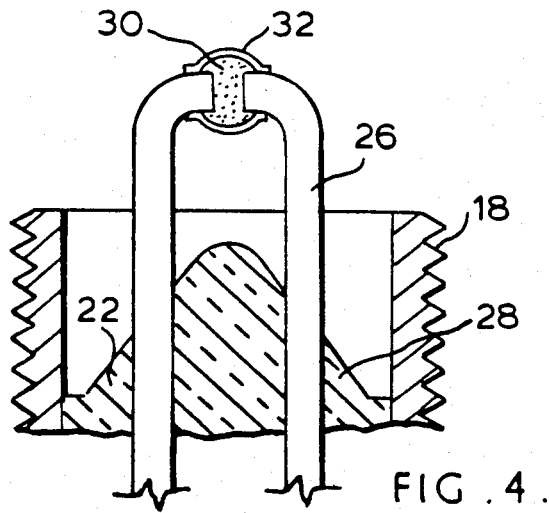
FIG. 4 is a section along the line IV—IV in FIG. 3.

The present invention accepts that charges in consecutive cycles will not have the same burning characteristics and a prediction is made as to whether the charge is faster burning or slower burning than the average charge. It is not necessary to provide absolute accuracy and it suffices merely to predict whether in comparison with the average charge the charge about to be burnt is faster burning or slower burning. Such a prediction can be made by measurement of the flow velocity in the charge prior to the spark. FIGS. 2, 3 and 4 show an anemometer integrated into a spark plug to enable this velocity measurement to be made.

The spark plug may be a conventional spark plug though it is possible that an enlarged diameter may be necessary to accommodate the additional electrodes required for the anenometer without risk of short circuit. The spark plug has a body 18, a ground electrode 20, an insulator 22 and a hot electrode 24. Holes 28 are formed in the insulator 22 through which pass two stout posts 26. A ceramic bead 30 is formed between the ends of the posts 26 and this is coated with a film 32 which acts in a manner analogous to a hot film anenometer. A current is passed through the film 32 to raise its temperature and the charge will cool the film at a rate proportional to its velocity. The cooling effect on the film can be measured to provide an indication of the velocity of the charge. This cooling effect can either be measured by keeping the temperature in the film constant and measuring the current required to maintain the temperature constant or by applying a constant current and measuring changes in temperature by monitoring changes in resistances of the film.

The design of the anenometer is, of necessity, a compromise. In the described embodiment, sensitivity is traded off for reliability since a prime consideration in the design of the anenometer is that it must survive within the hostile atmosphere of the combustion chamber and be capable of withstanding significant thermal shock. It must also be capable of cooling down significantly between cycles and it is for this reason that the stout posts 26 are provided. Naturally, the thermal inertia is increased, but the anenometer still remains sufficiently sensitive to implement the method of control disclosed below.

If the resistance of the hot film 32 is measured from cycle to cycle and compared with the average value then the signal resembles the waveform shown at 11 in FIG. 1. The electronic circuit for producing this waveform will be apparent to a person skilled in the art and it may, for example, comprise a sample-and-hold circuit connected to the output of the anenometer and triggered from the ignition system to sample the velocity representative signal at a predetermined angle before the mean best timing. Consecutive samples may be stored and averaged to produce a reference signal which is then compared in a comparator with the value derived by the sample-and-hold circuit for that cycle. It is only required of the comparator to provide a three level signal to indicate whether the current velocity is approximately equal to the mean, exceeds a first high threshold or falls below a second low threshold. This provides the consecutive signals represented by the waveform 11.

Based upon the signal from the comparator, the mean best timing is perturbed in a manner shown by the waveform 13. In the example illustrated, the mean best timing is assumed to be 25° BTDC but is perturbed by 5° in one direction or the other depending on whether the charge is predicted to be faster burning or slower burning.

When the spark timing is perturbed in the manner described, the resultant waveform for the flame front arrival times is shown at 15 in dotted lines and it will be noted that the amplitude A' of the fluctuations in this signal is smaller than the amplitude A. In other words, there is less fluctuation in the cranking angle corresponding at which combustion will be completed. As a result, the pressure diagram and the torque output will also display a smaller degree of cycle to cycle fluctuation.

When the mixture is stoichiometric, the amplitude A is at its lowest and this amplitude increases as the mixture is made progressively weaker. With increase in the amplitude A, the engine running becomes more erratic.

In order to correct for these more pronounced fluctuations, it may be desirable to increase the perturbations of the ignition timing, that is to say to alter the MBT, by more than 5° in order to introduce a greater degree of correction. Thus, if desired, the degree of correction may be varied in dependence upon the mixture strength.

It will be appreciated that just as the flame propagation speed varies from one cycle to another it varies from one piston to another and therefore in a multi-cylinder engine an individual timing control is required for each cylinder. The value of the MBT should be the same for all the cylinders but it is known that the optimum timing may vary from cylinder to cylinder and previous systems have already been proposed for varying the MBT from cylinder to cylinder. The invention may be used in conjunction with any other ignition system serving to set the MBT in that it does not affect the mean level of ignition timing but is concerned purely with reducing the effect of the fluctuations from one cycle to the next. Various other modifications and variations will no doubt occur to those skilled in the various arts to which this invention pertains. These and all other variations which basically rely on the teachings through which this disclosure has advanced the art are properly considered within the scope of this invention.

I claim:

1. An ignition system for an internal combustion engine including measuring means for measuring a parameter of the combustion charge in a cylinder of the engine prior to ignition in order to predict the burning characteristics of that charge so as to be able to vary the timing of the spark for igniting that charge in the same cycle in dependence upon the measured parameter in such a sense as to reduce cycle to cycle variations in the engine output torque, wherein said measuring means includes an anemometer within a cylinder combustion chamber of the engine to measure the charge velocity for use in perturbing the spark timing to advance or retard the timing in dependence upon the measured velocity.

2. An ignition system for an internal combustion engine including a cylinder combustion means for measuring cylinder combustion charge flow velocity in the vicinity of a spark gap prior to combustion and applying a spark to said spark gap, said cylinder combustion means including a spark plug with an integral anemometer having a resistive element positioned in close proximity to said spark gap for measuring flow velocity in the vicinity of said spark gap.

3. A method for controlling ignition of a cylinder combustion charge in an internal combustion engine including the steps of:
   measuring a parameter of the combustion charge in a cylinder of the engine prior to ignition in order to predict the burning characteristics of that charge;
   varying the timing of the spark for igniting that charge in the same cycle in dependence upon the measured parameter in such a sense as to reduce cycle to cycle variations in the engine output torque; and
   wherein said step of measuring a parameter of the combustion charge includes measuring the cylinder combustion charge flow velocity adjacent a spark gap of the cylinder for use in perturbing the spark timing to advance or retard the timing in dependence upon the measured velocity.

4. An ignition system as recited in claim 1, wherein said anemometer is mounted close to the spark gap.

5. An ignition system as recited in claim 4, wherein said anemometer for measuring the velocity of the cylinder combustion charge in the cylinder is incorporated in a spark plug.

6. An ignition system as recited in claim 1, 4 or 5, wherein the anemometer includes a resistive element serving to measure the charge velocity by the cooling effect of the fresh charge on the resistive element.

7. A method for controlling ignition as recited in claim 3 wherein said step of varying the timing of the spark includes monitoring the measured cylinder combustion charge flow velocity to detect crossings of predetermined thresholds and adjusting the ignition timing by fixed increments with each such crossing in a direction, advancing or retarding, to reduce cycle to cycle variations in the engine output torque.

8. A method for controlling ignition as recited in claim 7 wherein the step of measuring cylinder combustion charge flow velocity occurs before, and relatively close in time to, the expected earliest timing angle for the occurrence of the spark for igniting the charge.

9. A method for controlling ignition as recited in claim 8 wherein the step for adjusting the ignition timing includes varying the magnitude of the fixed increments by which the ignition is advanced or retarded in dependence upon the fuel to air ratio of the cylinder combustion charge, a greater degree of perturbation being introduced into the timing when the engine is running with a mixture lean of stoichiometry than when the engine is running with a stoichiometric ratio.

10. A method for controlling ignition as recited in claim 9 wherein said step of measuring a parameter of the combustion charge includes passing a current through a hot film anemometer and detecting the cooling effect on the film by the velocity of the cylinder combustion charge flow.

11. A method for controlling ignition as recited in claim 10 wherein said step of measuring a parameter of the combustion charge includes measuring the resistance of the hot film anemometer cycle to cycle and comparing the cycle to cycle measurement with the average value of the resistance.

12. A method for controlling the ignition as recited in claim 11 wherein said steps of measuring a parameter of the combustion charge and varying the timing of the spark for igniting that charge are done individually for each cylinder of the engine so as to provide for optimum ignition timing independently in each cylinder.

13. A spark plug for an ignition system for an internal combustion engine, said spark plug having
   a spark gap positioned in a combustion cylinder of the engine, and
   an integral anemometer mounted close to said spark gap for measuring the flow velocity of the combustion charge in the cylinder for perturbing the spark timing to advance or retard the timing in dependence upon the measured velocity.

14. A spark plug as recited in claim 13 wherein said anemometer includes a resistive element serving to measure the charge velocity by the cooling effect of the charge on the resistive element.

* * * * *